UNITED STATES PATENT OFFICE.

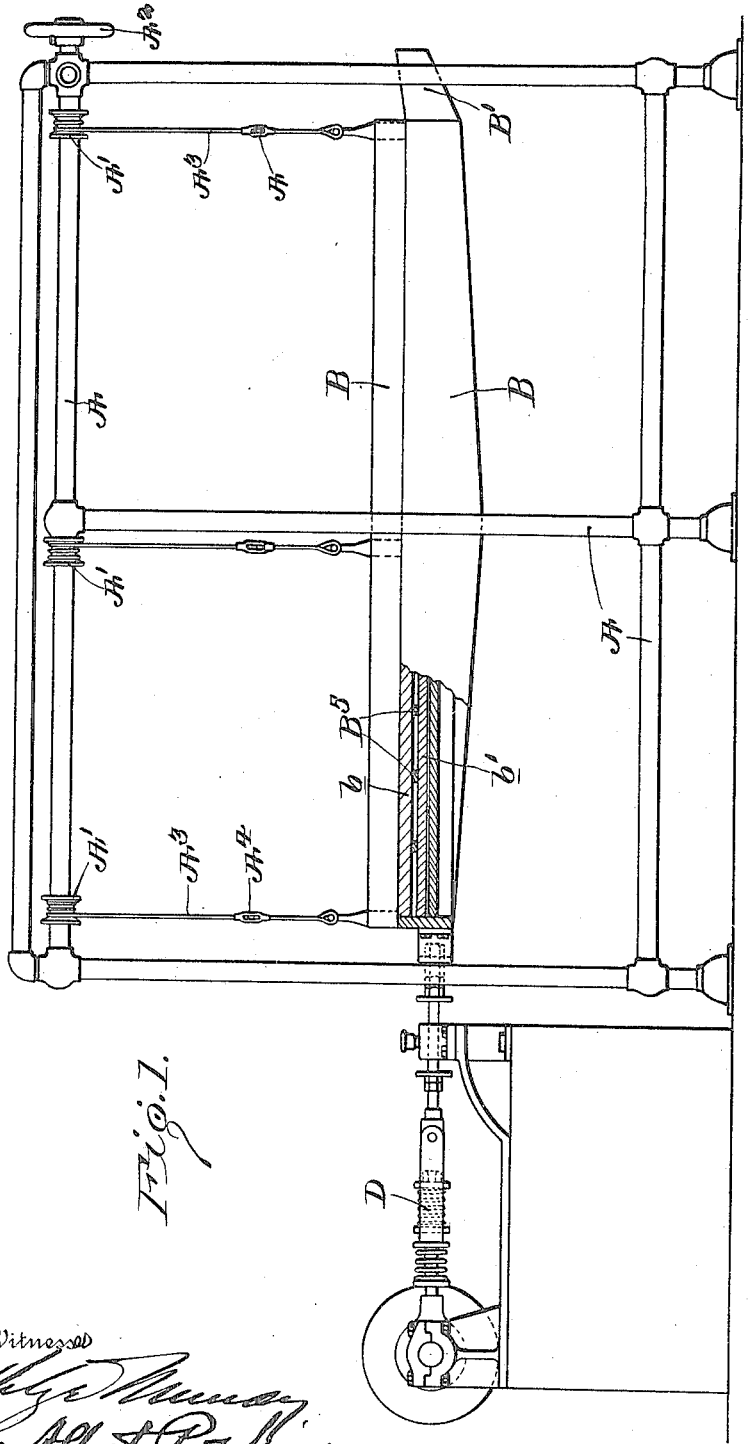

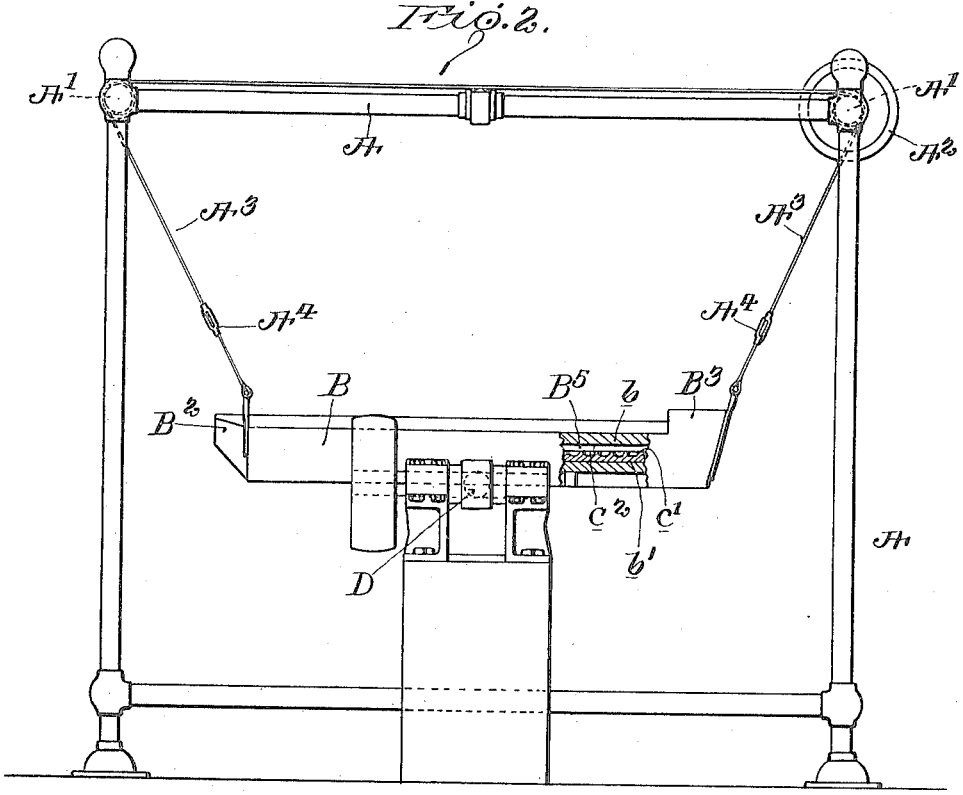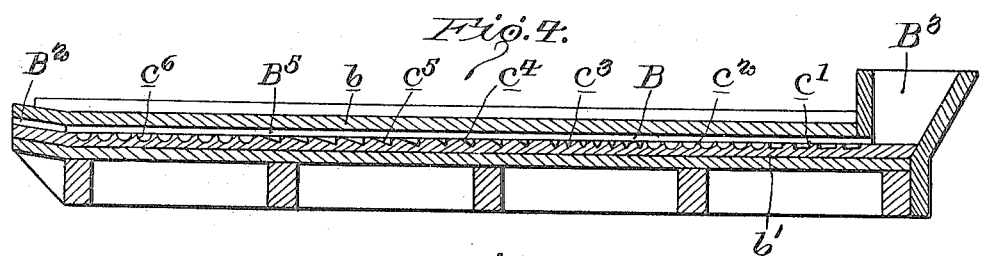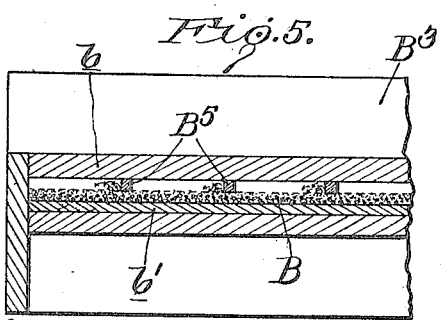

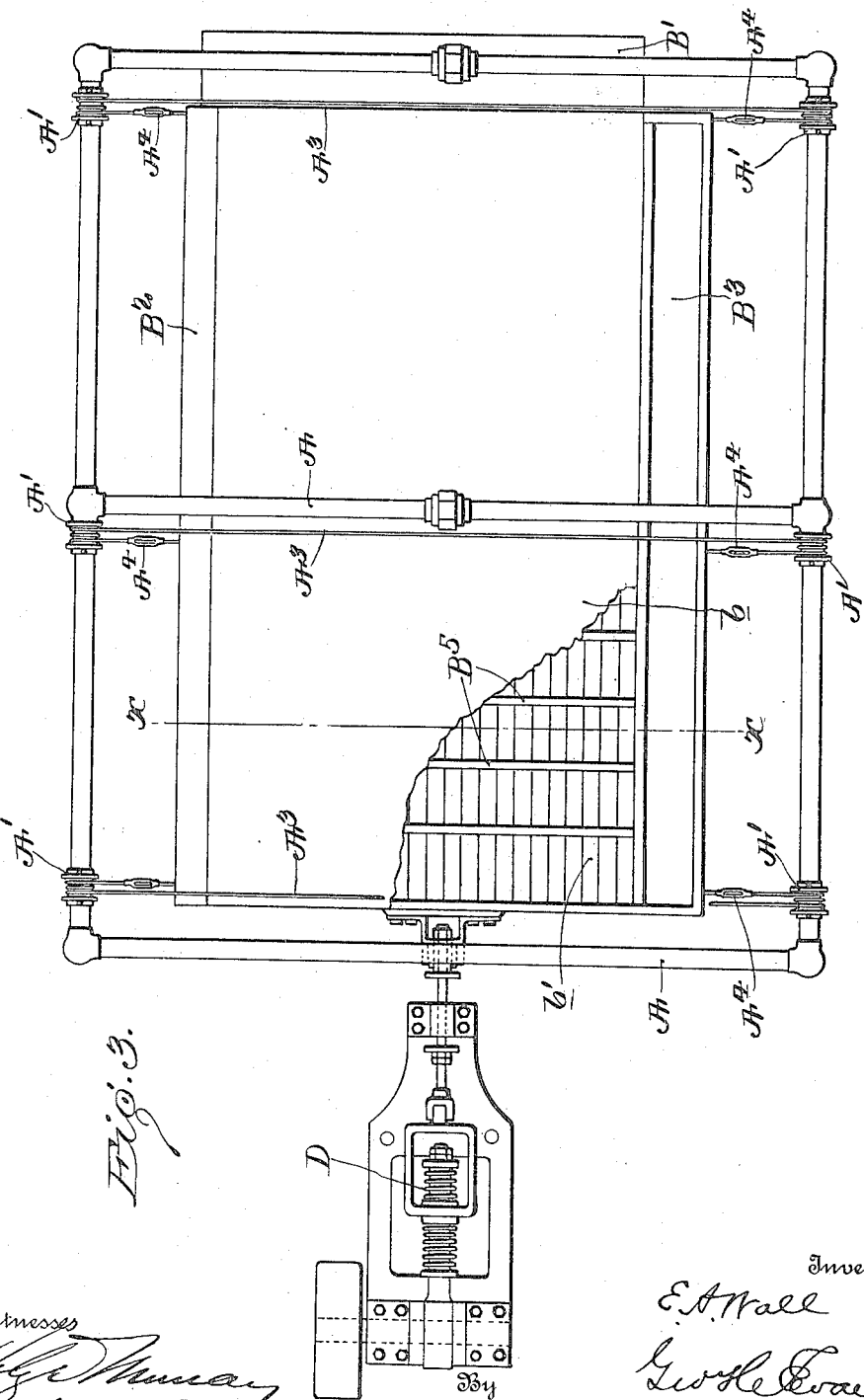

ENOS A. WALL, OF SALT LAKE CITY, UTAH.

TABULAR ORE WASHER OR CONCENTRATOR.

1,207,452.     Specification of Letters Patent.     Patented Dec. 5, 1916.

Application filed July 11, 1916. Serial No. 108,687.

*To all whom it may concern:*

Be it known that I, ENOS A. WALL, a citizen of the United States, residing at Salt Lake City, in the county of Salt Lake and State of Utah, have invented certain new and useful Improvements in Tabular Ore Washers or Concentrators, of which the following is a specification.

My invention relates to that type of ore washer or concentrator shown in my Patent 859,354, and while I retain, broadly, the tubular form therein shown and a similar reciprocating bumping mechanism, there are added novel features and the method of operation is totally different, for in said prior washer the concentrates are discharged through the bottom of the washer, and the concentrates, as well as the waste sands and the wash water, all travel longitudinally in the same direction.

The object of the present invention is to conduct the mineral concentrates settled upon the bottom or floor of the washer across the track of the flowing water and waste sands and out at a point where they may be continuously discharged; that portion of the mineral discharge end of the washer being inclined upward and terminating at a point sufficiently above the point at which the waste sands and water are discharged to prevent the wash water from escaping with the concentrates. Of course, the water will naturally flow to and be discharged at the lower opening, which is in the side of the washer opposite its intake side, but the discharge of the waste sands at this waste discharge point will depend upon the hydrostatic pressure in the higher tubular intake at the head side of the washer, and this discharge portion of the washer, like that in my patent, is inclined to a point above the lower wall of the cover of the washer so that the entire chamber within the washer may at all times be kept filled with water. In the present case, however, the mineral is spread out in a thin sheet over the entire floor of the washer if the same has a smooth uninterrupted surface, or lodges in the recesses formed by the longitudinal riffles where such are provided, and is moved along to the point of mineral discharge, while the overflowing water causes the waste sands to drift transversely across the cleansed ore and out to the point provided for their discharge.

A further object of this invention is to cause the formation of a series of "shock waves" in the thin sheet of wash water and material being treated, to facilitate the settling of the heavier particles of mineral upon the bottom of the washer or the channels therein, if provided. These "shock waves" are imparted by transverse strips on the under side of the cover and the bump given to the washer by its operating mechanism, which at the same time causes the accretions of heavier mineral on the bottom of the washer to move under the strips and across the track of the flowing water and waste sands to the point of mineral discharge at the end opposite the operating mechanism. It will be obvious that the cleansing and transporting power of the wash water confined in the narrow space between the top and bottom of the washer, in a thin sheet or stream, is greatly in excess of that attained by water flowing over an open top table after the manner of tables commonly employed and that at the same time separation and precipitation of the mineral particles will be accelerated and increased.

These objects I accomplish by the construction shown in the accompanying drawings, in which: Figure 1 is a partly sectional side elevation of my improved ore washer or concentrator. Fig. 2 is a partly sectional end elevation. Fig. 3 is a sectional plan. Fig. 4 is a transverse section on line $x$—$x$, Fig. 3. Fig. 5 is a detail sectional view of a portion of the washer to show the formation of the shock waves between the transverse strips on the under side of the cover.

A designates the frame work provided at opposite sides with longitudinal shafts having pulleys $A'$, one of the shafts having a hand wheel $A^2$ to operate it and simultaneously raise and lower the depending ends of the ropes or cables $A^3$ extending across the frame and wound on said pulleys.

B is the flattened tabular washer suspended at its longitudinal sides from said ropes and adjusted to a true horizontal position by means of turnbuckles $A^4$. The washer is reciprocated in the direction of its length by a suitable reciprocating bumping mechanism D, which may be that shown in the above patent or that in my Patent 1,011,680, or any suitable mechanism and need not, therefore, be further described.

The cover $b$ of the washer is spaced a short distance from the table or bottom $b'$, so that a narrow, flat channel will be formed. The mineral discharge end B' of the washer is inclined upwardly to a greater height than the lower wall of the cover b and the waste discharge side B² of the washer is also inclined upwardly to a point above the lower side of the cover b', but not quite as high as the mineral discharge end. Opposite the waste water discharge B² is the raised tubular intake or supply chute B³ for the wash water and mineral ore to be treated. It will be seen, therefore, that the flow of water will be across the tabular washer, while the travel of the heavier mineral matter will be longitudinally of the washer. Owing to the height of the intake and the two discharge openings above the cover of the washer, the washer will always remain filled with wash water, while, owing to the waste discharge B² being lower than the mineral discharge B', the flow will be from the intake or supply chute B³ to the discharge B² or transversely across the washer.

The table or bottom b' may be perfectly flat and unbroken, which is best for treating certain materials, or it may have any suitable form of longitudinally extending grooves, several forms of which I have shown in Fig. 4 at c', c², c³, c⁴, c⁵ and c⁶; the semicircular grooves c⁶ being the preferred form. These grooves, it will be seen, extend in a parallel series in the direction of the length of the table or floor and at right angles to the flow of the wash water. Extending across the under side of the cover, at right angles to the length and direction of reciprocation of the washer, I place a series of parallel ribs or strips B⁵, which cross the upper sides of the riffles when riffles are employed and under which strips B⁵ the heavy mineral concentrates will pass to the mineral discharge B'. Where riffles are not employed, as in Fig. 5, the strips do not extend down to the table or bottom b', but are spaced thereabove sufficiently to permit the passage of the concentrates thereunder.

The operation is as follows: Water and finely ground ore or slime are fed into the intake B³, which keeps the washer full at all times. The mechanism D will be set in operation and impart a rapid reciprocal bumping action to the washer in the direction of its length, which will cause the heavier mineral matter to settle along the entire surface of the table or bottom b' and at each bump the concentrates will move slightly toward the mineral discharge B'. At the same time, at every bump the transversely traveling thin sheet of water and material being treated will be thrown against the ribs or strips B⁵ and so cause "shock waves" to be formed therebetween. This has the effect of facilitating the settling of the heavier mineral particles upon the table or floor of the washer. The flow of the waste sands transversely of this mineral layer is due to the hydrostatic pressure in the higher tubular intake B³, which is sufficient to move the waste sands and water across the bumping action. Any desired velocity of flow of wash water and waste sands across the table or floor may be had by increasing or diminishing the amount of water introduced into the funnel-like intake B³.

The washer being filled with water at all times, the surface tension of the water will be broken so that the finer valuable material will be prevented from floating on the surface and being carried away. Any desired external contour may be given the washer.

This apparatus is especially adapted to the treatment, separation and cleansing of finely divided or pulverized particles of mineral from rock or earthy sands which have also been reduced to a finely pulverized or colloidal condition. In practice heretofore material of this character has been treated upon various forms of inclined surface, such as the revolving buddles or belts, as well as stationary sluices, having their operating surfaces covered with canvas and other fabric adapted to retain the mineral or heavier particles, while the waste sands were removed by a thin sheet of water flowing thereover. In all such devices, however, a large portion of the valuable mineral, owing to the extreme fineness to which it was reduced, failed to settle through the water and become attached to the surface of the sluice, buddle or other device employed. Various forms of concentrating tables having peculiarly formed or flat surfaces are also in use for treatment of material of this character, the result, in all cases, being an imperfectly cleansed mineral concentrate accompanied with the loss of the larger portion of the valuable metallic particles contained in the mass being treated.

What I claim is:

1. An ore concentrator constructed substantially in tabular form, having its mineral and waste discharge portions upwardly inclined, and its feed intake portion in tubular form, and extending above the horizontal portion of the surface of the table, and connected with a cover, superimposed and secured in position slightly above the surface of the table and joined with the outer walls of the tubular intake or feed portion in such manner as to provide a closed chamber between the lower wall or surface of the cover and the upper surface of the table, within which separation of the mineral ores from the waste is effected and through which the waste material is transported by hydrostatic pressure across the surface of the table and discharged at an elevation above the lower surface of the cover, as shown and specified, and means for discharging the concentrated mineral at another portion of the table substantially as specified and shown in the drawings.

2. An ore concentrator constructed substantially in tabular form, having its mineral and waste discharge portions upwardly inclined, and its feed intake portion in tubular form, and extending above the horizontal portion of the surface of the table, and connected with a cover, superimposed and secured in position slightly above the surface of the table and joined with the outer walls of the tubular intake or feed portion in such manner as to provide a closed chamber between the lower wall or surface of the cover and the upper surface of the table, within which separation of the mineral ores from the waste is effected and through which the waste material is transported by hydrostatic pressure across the surface of the table and discharged at an elevation above the lower surface of the cover, as shown and specified, and means for discharging the concentrated mineral at another portion of the table substantially as specified and shown in the drawings; and having the under surface of the cover provided with narrow strips, extending transversely upon and across the inner side of the cover, for the purpose of producing shock waves, to facilitate settling of the heavier particles to the surface of the table.

3. An ore concentrator constructed substantially in tabular form, having its mineral and waste discharge portions upwardly inclined, and its feed intake portion in tubular form, and extending above the horizontal portion of the surface of the table, and connected with a cover, superimposed and secured in position slightly above the surface of the table and joined with the outer walls of the tubular intake or feed portion in such manner as to provide a closed chamber between the lower wall or surface of the cover and the upper surface of the table, within which separation of the mineral ores from the waste is effected and through which the waste material is transported by hydrostatic pressure across the surface of the table and discharged at an elevation above the lower surface of the cover, as shown and specified, and means for discharging the concentrated mineral at another portion of the table substantially as specified and shown in the drawings; and having the under surface of the cover provided with narrow strips, extending transversely upon and across the inner side of the cover, for the purpose of producing shock waves, to facilitate settling of the heavier particles to the surface of the table; having its waste and mineral discharge portions upwardly inclined, substantially as shown and specified and for the uses and purposes therein stated, together with any suitable reciprocating operating mechanism.

In testimony whereof I affix my signature.

ENOS A. WALL.

Copies of this patent may be obtained for five cents each, by addressing the "Commissioner of Patents, Washington, D. C."